United States Patent

[11] 3,632,187

[72] Inventor: Millard A. Habegger
 Poughkeepsie, N.Y.
[21] Appl. No.: 874,173
[22] Filed: Nov. 5, 1969
[45] Patented: Jan. 4, 1972
[73] Assignee: International Business Machines Corporation
 Armonk, N.Y.

[54] LIGHT DEFLECTOR AND SCANNER
 8 Claims, 4 Drawing Figs.
[52] U.S. Cl. .................................. 350/150, 350/DIG. 2, 350/152, 350/157, 356/106 RL
[51] Int. Cl. .................................. G02f 3/00
[50] Field of Search .................................. 356/106 RL; 331/94.5; 350/147, 150, 152, 157, 160

[56] References Cited
UNITED STATES PATENTS
3,481,661 12/1969 Harris .................................. 350/150
3,499,700 3/1970 Harris et al. .................................. 350/150

Primary Examiner—David Schonberg
Assistant Examiner—Paul R. Miller
Attorneys—Hanifin and Jancin and John F. Osterndorf ABSTRACT: Light deflection and scanning apparatus employing a nonreciprocal optical device as a part of an optical circulator. The device has the property that if light is projected to it in one direction it is totally reflected and if it is projected in a second direction it is totally transmitted. By employing this device, optical energy may be coupled into and out of the circulator. The circulator is adjusted so that the optical energy follows a slightly off axis path with each revolution. Electro-optic means of a segmented type are provided in the path of the light in the circulator. The segments are individually controllable for selecting the location of exiting of the light from the circulator.

PATENTED JAN 4 1972 3,632,187

INVENTOR
MILLARD A. HABEGGER

BY John F. Osterndorf
ATTORNEY 3,632,187

LIGHT DEFLECTOR AND SCANNER

BACKGROUND OF THE INVENTION

1. Field of the Invention

This invention relates to light deflection and scanning apparatus and, more particularly, to apparatus utilizing an optical energy circulator for accomplishing the selective deflection of light.

2. Description of the Prior Art

Light beam deflectors and scanners are well known in the art. Rotating mirrors are one of the oldest forms of such apparatus. More recently in the development of the optics art and with the advent of the laser, scanning and deflection of a laser beam has been performed in the laser cavity. Such a device is described and claimed in U.S. Pat. No. 3,469,206.

Other types of light deflection systems act on the polarization parameter of the light beam in a series of cascaded beam deflection stages. Each stage utilizes a polarization control device and a birefringent deflector such that the output light beam is provided at any one of a plurality of discrete locations. Examples of such types of light deflection systems are found in copending patent applications Ser. Nos. 285,832 and 516,367, now U.S. Pat. Nos. 3,499,700 and 3,481,661 respectively, filed respectively in the names of Thomas J. Harris et al., and Thomas J. Harris and assigned to the assignee of this invention. Another example of such a system is found in U.S. Pat. No. 3,353,894.

SUMMARY OF THE INVENTION

As contrasted with the prior art light beam deflection and scanning apparatus, this invention provides a completely different approach for the control of the movement and positioning of light. An optical energy circulator is arranged in a slightly off axis condition to permit light to be circulated through it in a movable pattern.

A nonreciprocal optical device controls the entry and exiting of the beam from the circulator. The device has the property that if a light beam is projected to it in one direction within a given polarization state, it is totally reflected and if projected to it in a second direction with another given polarization state, it is totally transmitted. Polarization control means are disposed in the path of the light circulating in the circulator. The control is discretely exercised electronically on one of a plurality of segments. Selection is performed in a random or scanning manner. When the polarization of the circulating light is altered, it is caused to exit from the circulator through the nonreciprocal optical device at a location determined by the selected segments of the polarization control means. This apparatus can deflect the light in a random manner or in a line by line scan.

DESCRIPTION OF THE PREFERRED EMBODIMENT

Figure 1:
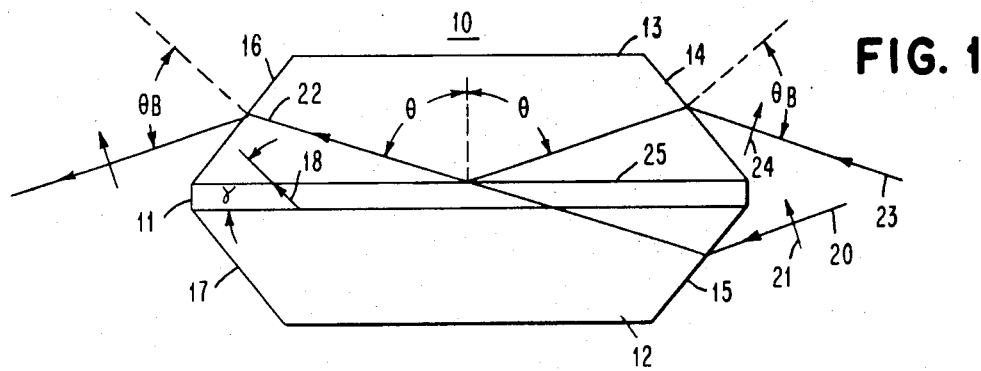
FIG. 1 is a schematic diagram of the nonreciprocal device employed in the apparatus of the invention.

Referring now to FIG. 1, an optical device 10 operates nonreciprocally in a unidirectional manner. This device is described and claimed more particularly in copending application Ser. No. 874,174 filed the same day as this application in the name of Millard A. Habegger and assigned to the same assignee as this invention.

In device 10 a birefringent plate 11 is formed with optical elements having optical windows, such as glass blocks 12, 13 in juxtaposed relationship with the incident faces of plate 11. Blocks 12, 13 are formed with Brewster angle windows 14, 15, 16, 17. The Brewster angle is indicated as $\theta_B$. Interposed between blocks 12, 13 and the respective faces of plate 11 is a film of oil having a refractive index equal to the higher index of refraction of plate 11. The glass blocks also have an index of refraction corresponding to the higher index of refraction of plate 11. If the birefringent material of plate 11 is sodium nitrate, that is, a material exhibiting a negative birefringence, the index of refraction of the film of oil and the glass blocks would correspond with the ordinary index of refraction of the plate.

Plate 11 is characterized by having its optic axis 18 formed at an acute angle $\gamma$ with respect to the incident faces of plate 11. For a sodium nitrate, this angle has been determined to be approximately 32°.

In operation, an input light beam 20 having a polarization direction 21 in the same plane as optic axis 18 is directed at window 15 of block 12. This beam is totally transmitted as beam 22 through plate 11 as it does not encounter any refractive index boundary between block 12 and plate 11. The polarization direction 21 of beam 20 is substantially perpendicular to optic axis 18. Beam 22 exits from the device through Brewster window 16.

When the light beam enters device 10 as beam 23 through window 14 and having a polarization direction 24, it is totally reflected at the face 25 of plate 11 into the path of beam 22. In this mode of operation beam 23 encounters a refractive index boundary at face 25 and therefore is totally reflected at this interface. Polarization direction 24 of beam 23 is substantially parallel to optic axis 18 of plate 11. The angle of incidence $\theta$ for beam 23 is substantially the same as the angle of refraction and for the material sodium nitrate it has been determined that this angle of incidence approximates 72°. The angle of incidence $\theta$ is greater than the critical angle as determined by the ratio of the lower index of refraction of plate 11 and the refractive index of the medium between plate 11 and block 13.

As is apparent, this nonreciprocal device differs from other types of optical devices such as conventional optical beam splitters. The nonreciprocal aspect of operation depends entirely on the direction of propagation of the incident beam of light and its polarization direction with respect to the optic axis of the device. The device is capable of totally reflecting substantially 100 percent of the incident energy when it is propagated as the beam 23 and of transmitting substantially 99 percent of the energy propagated in the reverse direction as the beam 20.

Figure 2:
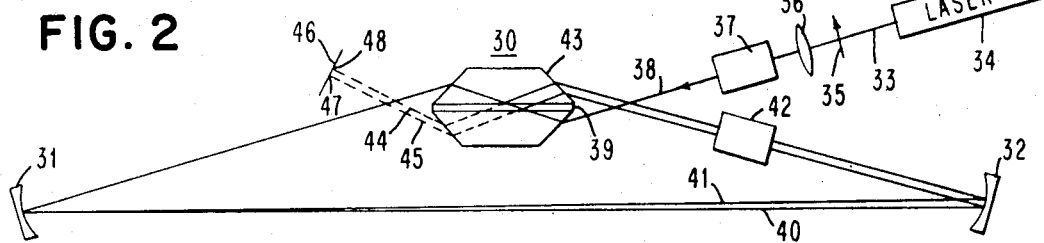
FIG. 2 is a schematic diagram of the optical circulator used for deflecting a light beam.

In this invention, as shown in FIG. 2 the nonreciprocal optical device of FIG. 1 is employed in an optical circulator. The circulator is a closed loop formed of device 30 and fully reflecting mirrors 31, 32 arranged such that the light follows a substantially triangular path.

A light beam 33 having a linear polarization direction 35 is provided by a laser 34. Laser 34 is a pulse type laser or if of the continuous wave type, an optical shutter 37 is inserted in the path of the beam 33. Shutter 37 may be an electro-optic modulator which may be activated so that a pulse of light is provided to the circulator. Lens 36 is used to bring the light provided by laser 34 to a focus in the circulator.

Light beam 38 provided from shutter 37 is coupled into the circulator through the nonreciprocal optical device 30 having a birefringent plate 39. An analyzer may be included in the path from shutter 37 to the circulator to assure that beam 38 has a desired polarization direction. One of the fully reflecting mirrors such as mirror 31 is positioned in a slightly off-axis or canted position such that each succeeding time that the circulating beam strikes it it is displaced in nonparallel manner from the preceding revolution of the beam. Thus, each succeeding time that the light strikes mirror 31, it effectively walks off the mirror so that the light follows a slightly different path.

Mirror 31 may be formed so that the displacement of each succeeding beam has an angular orientation of less than one minute. As shown in FIG. 2, the central rays of the beams between mirrors 31 and 32 have the first revolution through the circulator indicated at 40 and after many revolutions through the circulator at 41.

To accomplish the deflection of the beam, a polarization control apparatus 42 is included in the path of the light between mirror 32 and the window of reentry into device 30. As is apparent, the light is caused to scan across apparatus 42 and thus across the entry window 43 of device 30. When suitably activated to alter the polarization parameter of the light, as will be described more fully hereinafter, the light that reenters device 30 follows the scanning path indicated by the dotted lines 44, 45 out of the device and thus out of the circulator.

A suitable target 46 which may be a display screen or a photosensitive material is provided to accept the deflected and scanned output beam. The output position of the first revolution light is indicated at 47 and the output position of the light after many passes through the circulator is indicated at 48.

Figure 3:
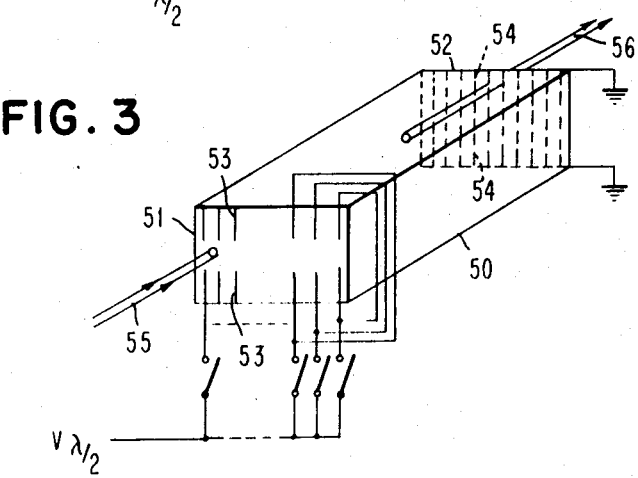
FIG. 3 is a perspective view of the segmented polarization control means used in the circulator of FIG. 2.

Referring now to FIG. 3, the polarization control apparatus employed in the circulator of FIG. 2 comprises an electro-optic switch 50 formed of a crystal having an incident face 51 and an exit face 52. Affixed to each of the faces are a plurality of pairs of electrode segments 53, 54, respectively. The paired electrodes 53 are individually connected to a voltage source that is the half-wave length voltage for the particular wave length of light. The paired electrodes 54 are connected to ground potential. With this configuration the electro-optic switch operates according to the longitudinal electro-optic effect, that is, the electric field is parallel to the direction of propagation of a light beam 55 provided at the incident face 51 to exiting light beam 56 provided from face 52.

Figure 4:
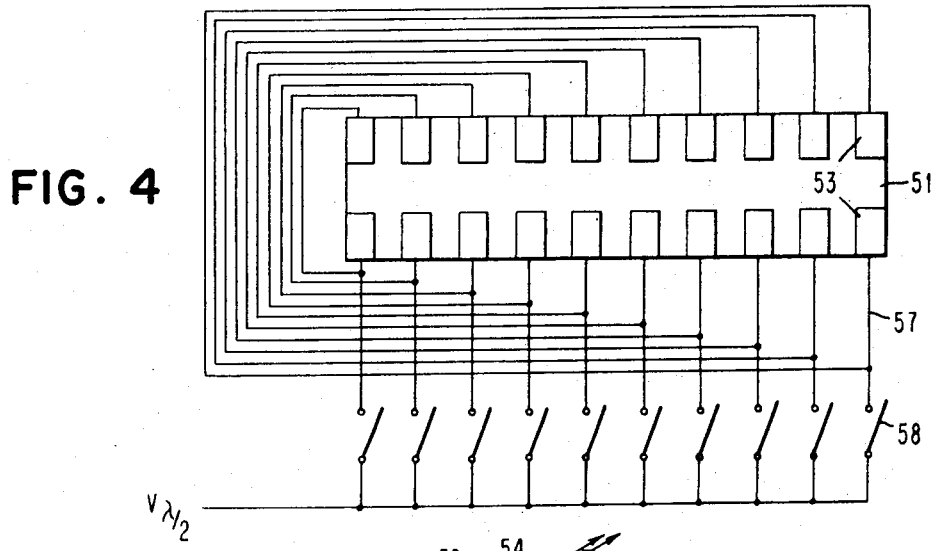
FIG. 4 is a sectional view of the incident face of the polarization control means of FIG. 3.

Incident face 51 of electro-optic switch 50 is shown in FIG. 4 as having plural pairs of electrode segments 53 affixed to it. The crystal used in electro-optic switch 50 may be a potassium dideuterium phosphate (KDP) crystal and the electrode segments 53 may be deposited gold electrodes. Between each of the pairs of segments an insulator, such as a strip of mylar 10 mils in width, may be placed. The presence of the insulators assure sharpness of the light when any particular pair of segments is activated. There is therefore no interaction of any light spot with the adjacent ones. Each pair of electrode segments is connected in common through an electrical connector 57, and switch 58 to the source of half-wave length voltage.

In operation, as light beam 55 is moved across incident face 51 of the electro-optic switch due to the action of mirror 31 of the circulator, a beam passes through and exits from the switch as beam 56. There is no change in the polarization state of the light beam. However, when a particular pair of segments are activated by connecting the half-wave length voltage for that wave length of light to them, the polarization state of the light beam is altered to a mutually orthogonal state such that when the beam reenters the nonreciprocal optical device 30 of the circulator, it is totally transmitted through birefringent plate 39 as one of the dotted line beams 44, 45. As is apparent, the output position of the beam on target 46 may be selected completely at random or with the proper operation of the switches connecting the half-wave length voltage to the electrode segments, the output beam can be scanned. The number of discrete output positions is determined by the number of pairs of electrode segments on the electro-optic switch.

Although it has been described that the longitudinal electro-optic effect is taking place it is also possible to utilize the transverse electro-optic effect. In either case the apparatus shown in FIG. 2 provides deflection and scanning in one dimension only such as the horizontal direction. To obtain scanning in two dimensions which are mutually orthogonal to one another, two such circulators, as shown in FIG. 2, are connected in series such that the output beam provided by the first one is coupled into the second one. The two circulators would be arranged orthogonal to one another. To assure fine focusing of the light beam provided from the circulator and to prevent interaction from one beam to the adjacent beam, the mirrors 31, 32 can be arranged to provide a focused beam at the input to the polarization control apparatus 42. In this way, the polarization control is effected at the focal point of the light beam.

If it is desired to obtain purely parallel output beams, this can be accomplished by avoiding the use of off-axis mirrors and by inserting a beam deflection stage following the polarization control apparatus 42 in the path of the circulating light beam. The beam deflection stage may comprise a deflecting plate for acting on the light beam to deflect it to a discrete path each time the light is incident on it.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A light deflector and scanner, comprising
means for circulating light in a progressively scanning closed loop path,
said circulating means including nonreciprocal optical means for coupling light into said circulating means and for causing said light to follow said path when the polarization of the light is in a first polarization state and for ejecting said light from the circulating means when the light is in a second polarization state, and
means positioned in the progressively scanning path within the circulating means for selectively altering the polarization state of the scanning light to the second state, so that the light is ejected from the circulating means by said nonreciprocal optical means at a predetermined discrete location.

2. The deflector and scanner of claim 1, wherein
said circulating means further comprises first and second reflecting means arranged with said nonreciprocal optical means to form said path,
said first reflecting means being positioned in an off-axis position to effect the progressive scanning of the light.

3. The deflector and scanner of claim 1, and further comprising
light deflection means positioned in said path for effecting a predetermined displacement of said light each time the light revolves in said circulating means,
whereby the progressive scanning of the light occurs in successive parallel paths.

4. A light deflector and scanner, comprising
means for circulating light in a progressively scanning closed loop path,
said circulating means including nonreciprocal optical means for coupling light into said circulating means and for causing said light to follow said path when the polarization of the light is in a first polarization state and for ejecting said light from the circulating means when the light is in a second polarization state, and
electro-optic means having means for discretely activating a selected longitudinal portion of the electro-optic means in the progressively scanning path within the circulating means,
said electro-optic means when activated changing the polarization state of the light scanning through it at that portion to the second state, so that the light is ejected from the circulating means by said nonreciprocal optical means at a predetermined discrete location.

5. The light deflector and scanner of claim 4, wherein
said light when coupled into said circulating means is in a first linear polarization state and is altered to a second linear polarization state orthogonal to the first state, and
said circulating means further comprises first and second reflecting means arranged with said nonreciprocal optical means to form said path, one of said reflecting means being positioned in an off-axis position to effect the progressive scanning of the light, said nonreciprocal means changing from a totally reflective mode of operation to a totally transmissive mode of operation when the polarization of said light is changed to the second state, whereby said light is ejected from said circulating means.

6. The light deflector and scanner of claim 5, wherein the electro-optic means is positioned at the focal point of said reflecting means and said electro-optic means changes the polarization state of focused light when activated, so that focused spots of light are provided from said circulating means and interference of adjacent spots is negated.

7. A light deflector and scanner, comprising first and second means arranged in series for discretely circulating light in individual progressively scanning closed loop paths, said first and second means being positioned orthogonal to one another so that the output of the first is the input to the second, each of said circulating means including nonreciprocal optical means for coupling light into said circulating means and for causing said light to follow each of said paths when the polarization of the light is in a first polarization state and for ejecting said light from the circulating means when the light is in a second polarization state, and means positioned in each of the progressively scanning paths within each of the circulating means for selectively altering the polarization state of the scanning light within that circulating means to the second state, so that the light is ejected from the second circulating means at a predetermined discrete location of a matrix of such locations.

8. A polarization control device, comprising an electro-optic crystal having incident and exit faces for transmitting polarized light therethrough, a first plurality of pairs of electrode segments affixed to one of said faces with each such segment pair being insulated from all others and all of said segment pairs being maintained at a first potential level, a second plurality of pairs of electrode segments affixed to the other of said faces with each such segment pair being insulated from all others and all of said segment pairs being arranged for individual connection to a second potential level, and means for selectively connecting one segment pair of said second plurality at said second potential level, whereby the polarization of light provided at the incident face that encounters the selected segment pair is changed from one polarization state to another at the exit face.

* * * * *